(12) United States Patent
Tian et al.

(10) Patent No.: US 8,332,472 B2
(45) Date of Patent: Dec. 11, 2012

(54) PEER TO PEER SYSTEM FOR SUPPORTING TIME SHIFT SERVICE

(75) Inventors: Hongliang Tian, Shenzhen (CN); Sui Xiao, Shenzhen (CN); Xin Zhang, Shenzhen (CN)

(73) Assignee: ZTE Corporation, Hi-Tech Industrial Park Nanshan District, Shenzhen, Guangdong Province (CN)

( * ) Notice: Subject to any disclaimer, the term of this patent is extended or adjusted under 35 U.S.C. 154(b) by 236 days.

(21) Appl. No.: 12/668,716

(22) PCT Filed: Nov. 29, 2007

(86) PCT No.: PCT/CN2007/003374
§ 371 (c)(1),
(2), (4) Date: Jun. 10, 2010

(87) PCT Pub. No.: WO2009/006768
PCT Pub. Date: Jan. 15, 2009

(65) Prior Publication Data
US 2010/0268777 A1    Oct. 21, 2010

(30) Foreign Application Priority Data
Jul. 12, 2007    (CN) .......................... 2007 1 0128458

(51) Int. Cl.
*G06F 15/16* (2006.01)

(52) U.S. Cl. ...................................... 709/204; 709/231

(58) Field of Classification Search .................. 709/204, 709/208–211, 217–219, 226, 229, 230–237; 715/733–759
See application file for complete search history.

(56) References Cited

U.S. PATENT DOCUMENTS

| | | | | |
|---|---|---|---|---|
| 7,409,140 | B2* | 8/2008 | Rodriguez et al. | 386/248 |
| 7,512,315 | B2* | 3/2009 | Kaminski et al. | 386/344 |
| 2007/0294422 | A1* | 12/2007 | Zuckerman et al. | 709/230 |
| 2008/0235746 | A1* | 9/2008 | Peters et al. | 725/111 |

FOREIGN PATENT DOCUMENTS

| | | |
|---|---|---|
| CN | 1695377 | 11/2005 |
| CN | 1801929 | 7/2006 |
| CN | 1947422 | 4/2007 |
| WO | WO 2004057867 | 7/2004 |

* cited by examiner

*Primary Examiner* — Ruolei Zong
(74) *Attorney, Agent, or Firm* — Gable Gotwals

(57) ABSTRACT

The present invention discloses a Peer to Peer system for supporting time shift service, which includes: a media source system, used for dividing the input live broadcasting stream into media blocks to form media block sequence, grouping every predetermined number of the media blocks into media segment, and sending the media segment to each of several nodes; a media distribution management system, used for managing the state information of the media segments on the several nodes and realizing positioning function of the media segments, and several nodes, each of the several nodes comprises a playing buffer, a storage buffer, and a disk buffer.

10 Claims, 2 Drawing Sheets

PEER TO PEER SYSTEM FOR SUPPORTING TIME SHIFT SERVICE

CROSS-REFERENCE TO PENDING APPLICATIONS

This application is based on PCT Patent Application No. PCT/CN2007/003374, filed on Nov. 29, 2007, which was based on Chinese Patent Application No. 200710128458.5, filed Jul. 12, 2007.

FIELD OF THE INVENTION

The present invention relates to the fields of Peer to Peer (or P2P for short) network and broadband stream media, in particular to a P2P system for supporting time shift service.

BACKGROUND OF THE INVENTION

With the fast development of the Internet and broadband access network, live video service can be deployed on the Internet by employing the P2P technology successfully in large scale.

The present system are not compatible of supporting time shift service, namely, a user can not review a program in live broadcasting or watch a program that has been broadcasted. The online live broadcasting service is mainly used on the broadcasting for sports games and entertainment programs. A user often needs to watch a program that has been broadcasted or temporarily review a scene that has been missed. If a system can support time shift service, the demands of users can be better satisfied and the quality of user experience can be promoted.

The above time shift function can be realized by referring to the operation of a personal video recorder, namely, a client terminal records the whole program being watched in a disk. Therefore, when a user selects to play backward, the data in a disk can be played so that the client can watch a previous program, the data in a disk can also be replayed. The method, though very simple, consumes much resources on a client terminal: first, the continuous recording of a video while playing puts much pressure on disk I/O; second, the cost of disk storage is very high, a client terminal should have a big disk space for storing the completed video programs independently; third, the method is applicable for the user to replay a program that has been broadcasted, but it is hard for the user to replay a program that has not yet been watched, which results in a big limit.

The reason for the above limit is that the method tries to let each client terminal finish the above functions independently, resulting in the problem of the high price of realization, namely, both the big costs on storage and pressure on disk I/O. It's undoubtedly ideal if it is possible for a plurality of client terminals to take part in the above functions to complete the time shift service. But the related technology has not yet been realized.

SUMMARY OF THE INVENTION

In view of the above problems, the present invention is proposed. Based on the P2P share storage theory, the invention proposes a P2P system for supporting the time shift TV service, which can help reduce both the storage cost of client terminals and pressure on disk I/O.

According to the present invention, a P2P system for supporting time shift service is provided.

The system includes: a media source system, used for dividing the input live broadcasting stream into media blocks to form media block sequence, grouping every predetermined number of the media blocks into media segment, and sending the media segment to each of several nodes; a media distribution management system, used for managing the state information of the media segments on the several nodes and realizing positioning function of the media segments, and several nodes, each of the several nodes comprises a playing buffer used for storing the live broadcasting media segments which is currently broadcasted, a storage buffer used for storing the broadcasted media segments which is recently broadcasted, and a disk buffer used for storing the broadcasted media segments which is broadcasted a relatively long time ago.

Wherein, the media source system further sets the following information in the head of each media blocks: segment number, which is used for marking the number of the media segment to which the media block belongs; block number, which is used for marking the number of the media block in the media block sequence; and segment identifier, which is used for marking the location of the media block in the media segment to which the media block belongs. The location marked by the segment includes: start block, middle block, and end block.

The state information of the media segment includes: whether there's a media segment and whether the media segment possesses external service capability.

The media segment stored in each node performs probabilistic transfer from playing buffer, storage buffer, to disk buffer.

Concretely, when the playing buffer has stored complete media segments, the complete media segment will be transferred to the storage buffer with a first predetermined probability. When the storage buffer is full, media segments that need to be covered will be transferred to the disk buffer with a second predetermined probability; similarly, when the disk buffer is full, some existing media segment needs to be covered.

In the storage buffer and the disk buffer, the covered media segment is selected according to the chronological order of the existence of the media segments.

While performing live broadcasting, the node inquires the source node of the live broadcasting media segment from the media distribution management system, and interacts with the source node to acquire the data of the live broadcasting media segment to perform live broadcasting; while broadcasting a broadcasted program is needed, the node inquires the source node of the broadcasted media segment from the media distribution management system, and interacts with the source node to acquire the data of the broadcasted media segment to perform broadcasting.

In addition, when the node goes on-line/off-line, gets access to or withdraws live broadcasting, or when the media segments stored in the storage buffer and the disk buffer or the service capability thereof change, a message will be sent to the media distribution management system, the media distribution system updates the data of media distribution.

By using the present invention, the media data of time shift service is recorded and stored in segments by a plurality of participated nodes. Each of the nodes only needs to record and store a small part of the media segments, which greatly reduces the cost of client terminals. With a large number of participated nodes, there're many service providing sources, thus a good expansibility of the system scale can be realized.

DESCRIPTION OF THE DRAWINGS

The drawings illustrated here provide a further understanding to the present invention and form a part of the application, and the exemplary embodiments of the present invention and the description thereof are used to explain the present invention, rather than limit the present invention improperly, in which.

DETAILED DESCRIPTION OF THE INVENTION

The embodiments of the invention are illustrated by referring to the figures. The following embodiments provide an all-round and thorough understanding to the present invention, rather than limit on the present invention.

According to the present invention, a Peer to Peer system for supporting time shift service is provided.

Figure 1:
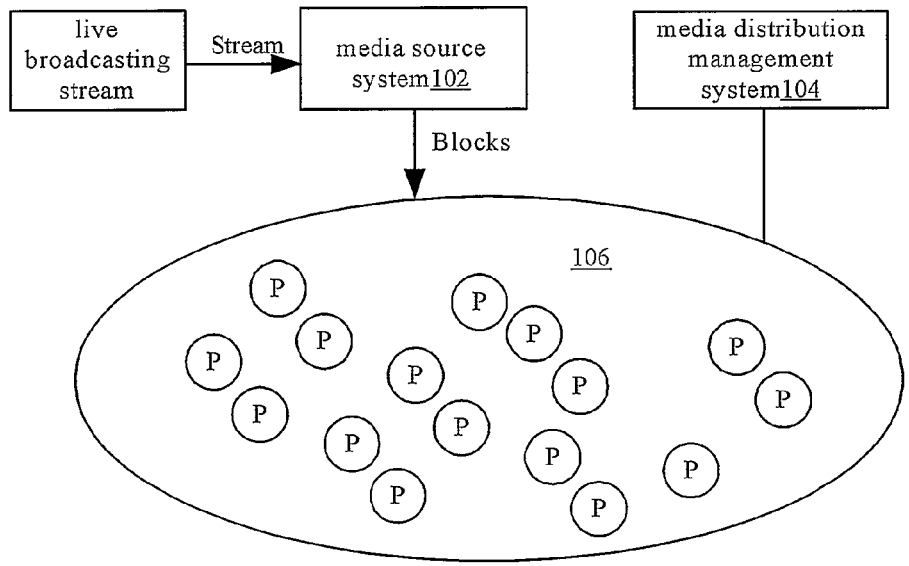
FIG. 1 is the schematic figure of the P2P system for supporting time shift service according to the embodiments of the present invention.

As shown in FIG. 1, the P2P system includes: media source system 102, media distribution management system 104 and several P2P nodes 106 (or node for short). The following provides a further description to the above parts.

The media source system 102, used for dividing the input live broadcasting stream into media blocks to form media block (or block for short) sequence, grouping every predetermined number of the media blocks into media segment, and sending the said media segment to each of several nodes. The media source system further sets the following information in the head of each media blocks: segment number, which is used for marking the number of the media segment to which the media block belongs; block number, which is used for marking the number of the media block in the media block sequence; and segment identifier, which is used for marking the location of the media block in the media segment to which the media block belongs. Wherein, the location marked by the segment includes: start block (start sign), middle block (middle sign), and end block (end sign).

Figure 2:
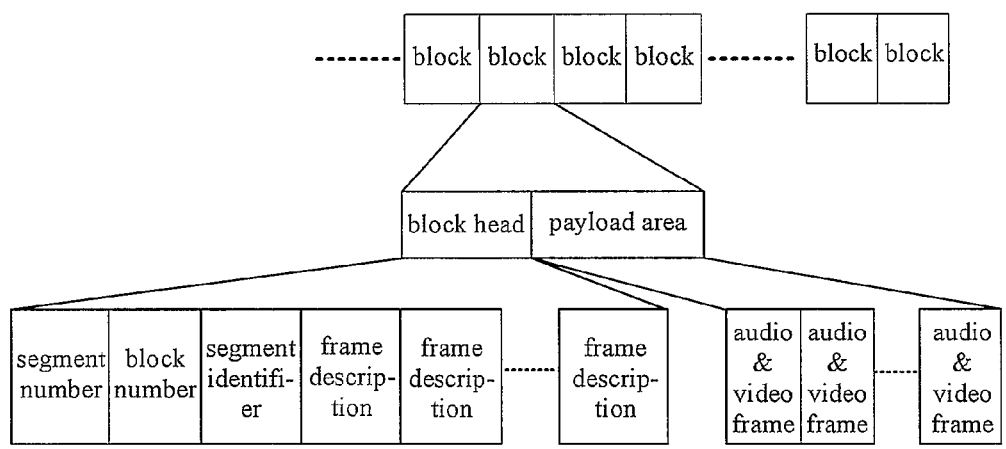
FIG. 2 is the schematic figure of an illustrative structure of the media segments and media blocks according to the embodiments of the present invention.

FIG. 2 shows illustrative structure of the media segments and media blocks. As shown in FIG. 2, a media segment is composed of media blocks of a fixed number and each media block includes a plurality of video and audio frames. The head of media blocks includes the characters of segment number, block number, segment identifier field, for instance, 00 indicates the media block is the start block of the media segment, 11 indicates the media block is the end block of the media segment, 01 or 10 indicates the media block is the middle block of the media segment. In this way, a client terminal can completely confirm the boundary of a media segment by checking the head of media blocks.

The media distribution management system 104 is used for managing the state information (including whether there's a media segment and whether the media segment possesses external service capability) of the media segments on the several nodes and realizing positioning function of the media segments (including the live broadcasting media segments and the broadcasted media segments hereinafter).

When the node goes on-line/off-line, gets access to or withdraws live broadcasting, the media segments in the storage buffer and the disk buffer change and the service capability of the storage buffer and the disk buffer changes, a message will be sent to the media distribution management system 104 so that the media distribution system can update the data of media distribution in time.

As for of the several P2P nodes 106, each node includes three buffers: (1) playing buffer, which is used for storing the live broadcasting media segments (data) which is currently broadcasted, and the buffer is similar to a sliding window which obtains data of media blocks from other nodes continuously while continuously playing, aging and releasing the buffer; wherein, the live playing buffer of each node is considered as a special segment (namely, live broadcasting media segment) of the broadcasting channel for management; (2) storage buffer, which is used for storing the broadcasted media segments (data) which is recently broadcasted; (3) disk buffer, which is used for storing the broadcasted media segments (data) which is broadcasted a relatively long time ago.

The media segment stored in each node performs probabilistic transfer from playing buffer, storage buffer, to disk buffer. The probability of transfer can be decided by previous experience.

Concretely, when the playing buffer has stored complete media segments, the complete media segment will be transferred to the storage buffer with a first predetermined probability (e.g., 5%). When the storage buffer is full, media segments that need to be covered will be transferred to the disk buffer with a second predetermined probability (e.g., 20%), similarly, when the disk buffer is full, some existing media segment needs to be covered.

In the storage buffer and the disk buffer, the covered media segment is selected according to the chronological order of the existence of the media segments. In this way, more outdated data is more easily to be covered, which meets the habits of time shift service users, namely, newer contents are the more possibly to be reviewed. For example, the most outdated segment can be selected as covered segment. A buffer may have the segments which are played today and the segments which are played yesterday, the segments which are played yesterday will be selected to be covered.

Figure 3:
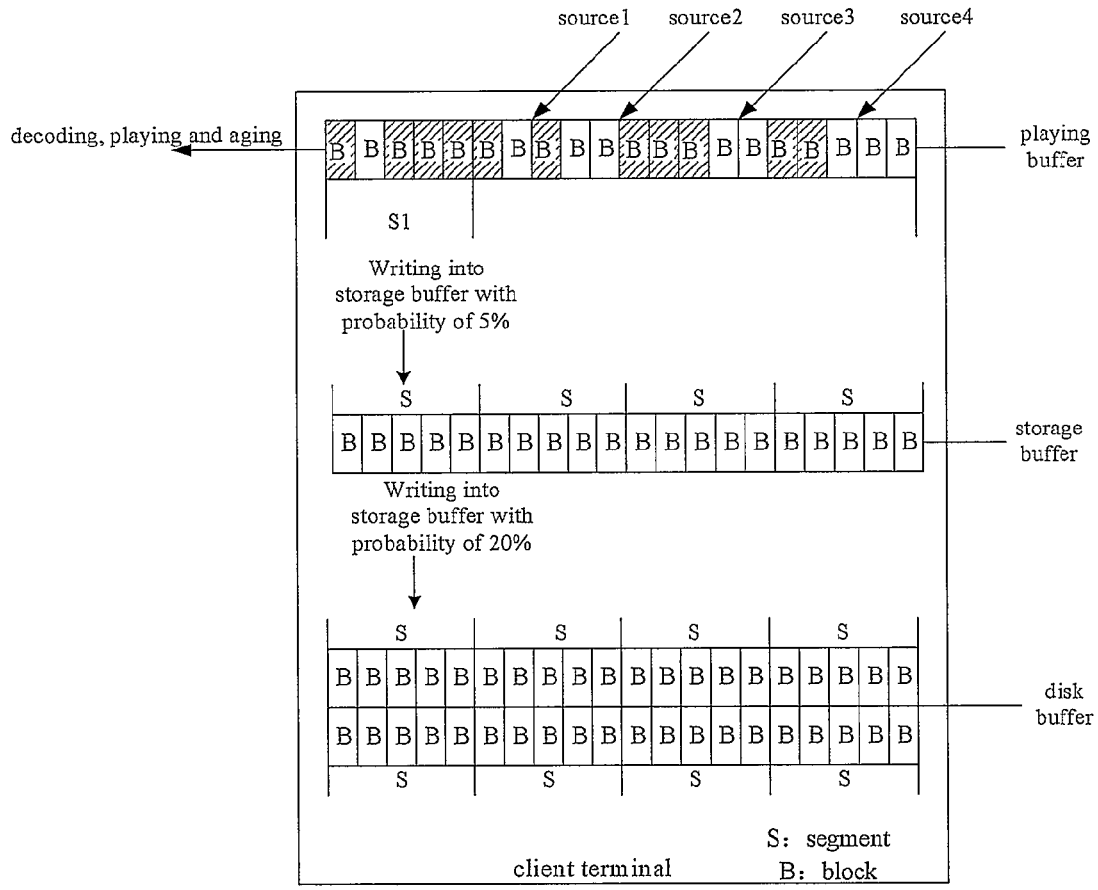
FIG. 3 is the schematic figure of the buffers and the transfer process of the media segments according to the embodiments of the present invention.

FIG. 3 is the schematic figure of the above buffers and the transfer process of the media segments. Referring to FIG. 3, the invention is more easily to be understood.

Figure 4:
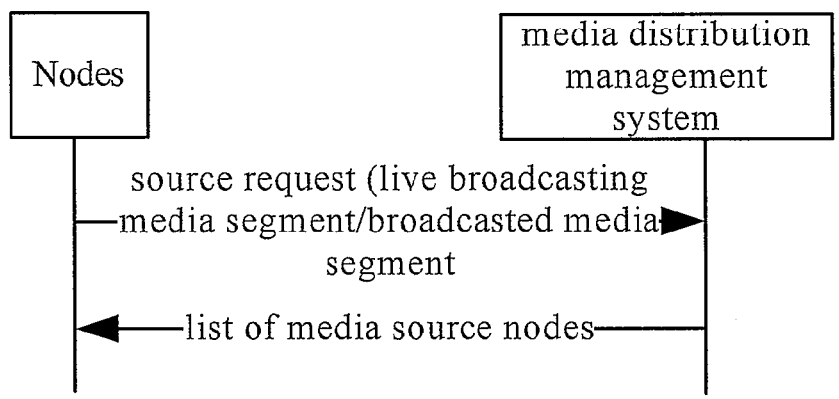
FIG. 4 is the schematic figure of the inquiry process of media segment source node according to the embodiments of the invention.

As mentioned above, the media distribution management system 104 can realize the positioning function of the media segments (including the live broadcasting media segments and the broadcasted media segments hereinafter). The positioning of source node of the media segments is realized through simple inquiry. As shown in FIG. 4, a node sends a source request of the live broadcasting media segments/the broadcasted media segments to the media distribution management system, the media distribution management system returns the list of media source nodes.

For instance, while performing live broadcasting, a node inquires the source node of the live broadcasting media segments in the media distribution management system 104, and interacts with the source node to acquire and play the live broadcasting data. In live broadcasting, if a user needs to review a broadcasted program, the node inquires the source node of broadcasted media segments again in the media distribution management system 104, and interacts with the source node to acquire and play the data of broadcasted media segments. After the end of the acquired data segment, the node inquires the source node of the following segment in the media distribution management system 104 to continue playing.

If a user needs to shift back to live broadcasting, the source node of the live broadcasting media segments will be inquired again in the media distribution management system to enter live broadcasting. If a user needs to review a broadcasted program, like watching video to demands (VOD), the source node of the VOD media segment will be acquired through the inquiry in the media distribution management system.

In summary, by means of the present invention, each client terminal can realize the time shift TV service without recording and storing the whole program, the resource consumption on the client terminal is greatly reduced.

The embodiment of the present invention is described for the purpose of illustration, not for limiting the present invention. For those skilled in the field, various alterations and modifications can be made to the present invention. Any alterations, substitutions and modifications falling into the spirit and principle of the present invention shall be protected by the claims of the present invention.

What we claim:

1. A Peer to Peer system for supporting time shift service includes:
   a media source system comprising a processor and a memory, used for dividing the input live broadcasting stream into media blocks to form media block sequence, grouping every predetermined number of the media blocks into media segment, and sending the said media segment to each of several nodes;
   a media distribution management system comprising a processor and a memory, used for managing the state information of the said media segments on the said several nodes and realizing positioning function of the said media segments, and
   the said several nodes, each of the said several nodes comprises a playing buffer used for storing the live broadcasting media segments which is currently broadcasted, a storage buffer used for storing the broadcasted media segments which is recently broadcasted, and a disk buffer used for storing the broadcasted media segments which is broadcasted a relatively long time ago;
   wherein, the said media segment stored in said each of several nodes performs probabilistic transfer from playing buffer, storage buffer, to disk buffer;
   wherein, when the said media segments stored in the said storage buffer and the said disk buffer or a service capability thereof change, a message will be sent to the said media distribution management system, the said media distribution system updates the data of media distribution.

2. The Peer to Peer system for supporting time shift service according to claim 1, wherein, the media source system further sets the following information in the head of each said media blocks: segment number, which is used for marking the number of the media segment to which the said media block belongs; block number, which is used for marking the number of the said media block in the said block sequence; and segment identifier, which is used for marking the location of the said media block in the said media segment to which the said media block belongs.

3. The Peer to Peer system for supporting time shift service according to claim 2, wherein, the said location marked by the said segment includes: start block, middle block, and end block.

4. The Peer to Peer system for supporting time shift service according to claim 1, wherein, the state information of the said media segment includes: whether there's a media segment and whether the media segment possesses external service capability.

5. The Peer to Peer system for supporting time shift service according to claim 1, wherein, when the said playing buffer has stored complete media segments, the said complete media segments will be transferred to the said storage buffer with a first predetermined probability.

6. The Peer to Peer system for supporting time shift service according to claim 1, wherein, when the said storage buffer is full, media segments that need to be covered will be transferred to the said disk buffer with a second predetermined probability; when the said disk buffer is full, some existing media segment needs to be covered.

7. The Peer to Peer system for supporting time shift service according to claim 6, wherein, in the said storage buffer and the said disk buffer, the covered media segment is selected according to the chronological order of the existence of the media segments.

8. The Peer to Peer system for supporting time shift service according to claim 1, wherein, while performing live broadcasting, at least one node in the said several nodes inquires the source node of the said live broadcasting media segment from the said media distribution management system, and interacts with the said source node to acquire the data of the said live broadcasting media segment to perform live broadcasting.

9. The Peer to Peer system for supporting time shift service according to claim 1, wherein, when at least one node of the said several nodes goes into at least one state from the group of states consisting of on-line/off-line, gets access to live broadcasting and withdraws live broadcasting.

10. The Peer to Peer system for supporting time shift service according to claim 1, wherein while broadcasting a broadcasted program is needed, at least one node in the said several nodes inquires the source node of the said broadcasted media segment from the said media distribution management system, and interacts with the said source node to acquire the data of the said broadcasted media segment to perform broadcasting.

* * * * *